United States Patent
Steingart et al.

(10) Patent No.: US 9,893,354 B2
(45) Date of Patent: Feb. 13, 2018

(54) HYPER-DENDRITIC NANOPOROUS ZINC FOAM ANODES, METHODS OF PRODUCING THE SAME, AND METHODS FOR THEIR USE

(71) Applicant: The Trustees of Princeton University, Princeton, NJ (US)

(72) Inventors: Daniel A. Steingart, Princeton, NJ (US); Mylad Chamoun, Princeton, NJ (US); Benjamin Hertzberg, Princeton, NJ (US); Greg Davies, Princeton, NJ (US); Andrew G. Hsieh, Princeton, NJ (US)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 163 days.

(21) Appl. No.: 15/049,489

(22) Filed: Feb. 22, 2016

(65) Prior Publication Data

US 2017/0025677 A1    Jan. 26, 2017

Related U.S. Application Data

(60) Provisional application No. 62/121,699, filed on Feb. 27, 2015.

(51) Int. Cl.
| | |
|---|---|
| *H01M 4/00* | (2006.01) |
| *H01M 4/42* | (2006.01) |
| *H01M 4/04* | (2006.01) |
| *H01M 4/24* | (2006.01) |
| *H01M 4/29* | (2006.01) |
| *H01M 4/38* | (2006.01) |
| *H01M 4/66* | (2006.01) |
| *C25D 5/00* | (2006.01) |
| *C25D 5/16* | (2006.01) |
| *C25D 3/22* | (2006.01) |
| *H01M 4/02* | (2006.01) |

(52) U.S. Cl.
CPC .............. *H01M 4/42* (2013.01); *C25D 5/00* (2013.01); *C25D 5/16* (2013.01); *H01M 4/0452* (2013.01); *H01M 4/244* (2013.01); *H01M 4/29* (2013.01); *H01M 4/38* (2013.01); *H01M 4/661* (2013.01); *C25D 3/22* (2013.01); *H01M 2004/021* (2013.01); *H01M 2004/027* (2013.01)

(58) Field of Classification Search
CPC ........................................................ H01M 4/00
See application file for complete search history.

(56) References Cited

U.S. PATENT DOCUMENTS

2003/0099882 A1* 5/2003 Hampden-Smith ...... C25D 3/22
429/229

* cited by examiner

*Primary Examiner* — Jacob Marks
(74) *Attorney, Agent, or Firm* — Norris McLaughlin & Marcus PA

(57) ABSTRACT

Disclosed are hyper-dendritic nanoporous zinc foam electrodes, viz., anodes, methods of producing the same, and methods for their use in electrochemical cells, especially in rechargeable electrical batteries.

9 Claims, 19 Drawing Sheets

HYPER-DENDRITIC NANOPOROUS ZINC FOAM ANODES, METHODS OF PRODUCING THE SAME, AND METHODS FOR THEIR USE

This invention(s) disclosed herein was/were made with government support under Grant No. DE-AR0000400 awarded by the U.S. Department of Energy, Advanced Research Projects Agency-Energy (ARPA-E) and Grant No. CMMI-1402872 awarded by the National Science Foundation. The government has certain rights in the invention(s).

This patent application incorporates by reference the entirety of U.S. Patent Application Ser. No. 62/121,699 filed on 27 Feb. 2015, as if fully set forth herein.

Zinc is a low cost and abundant material, and its strong reducing potential combined with water stability give it a high energy density. Zinc possesses many characteristics that are favorable for large scale energy storage: high volumetric energy density, low cost, low toxicity, global abundance, and chemical compatibility with aqueous electrolytes. Not surprisingly then, zinc has a rich history as an anode for static, redox, semi-solid and flow assisted cells, and remains attractive for secondary battery applications despite the current popularity of lithium ion batteries due to its abundance, safety and scalability. However, historically the use of zinc anodes has been limited by morphological uncertainty, which is strongly dependent on local current density and pH. Two typically undesirable regimes are: ramification and/or the presence of dendrites which cause electrical-short-circuits, and/or the precipitation of zinc oxide that can irreversibly passivate a surface. In conventional static zinc systems (composites, pastes and powders), these mechanisms lead to terminal failure, and in flow and flow-assisted cells they can be reversed only at the cost of a relatively large system overhead. Thus, the prior art has frequently dissuaded the consideration and exploitation of dendritic zinc in anodes.

The present invention addresses and overcomes shortcomings known in the prior art relating to zinc electrodes in electrical cells, particularly in rechargeable electrical batteries.

In a first aspect the present invention provide a hyper-dendritic nanoporous zinc foam electrode.

In a second aspect the present invention provides methods of producing a hyper-dendritic nanoporous zinc foam electrode.

In a third aspect, the present invention provides methods for the use of the disclosed hyper-dendritic nanoporous zinc foam electrodes, including their use in electrochemical cells, especially in rechargeable electrical batteries.

These and further aspects of the invention are described in more detail in the following specification.

Figure 1A:
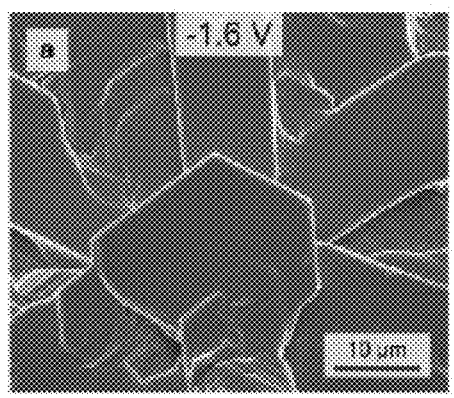
FIGS. 1A, 1B, 1C, 1D, 1E, 1F, 1G, 1H and 1J are photomicrographs of samples of hyper-dendritic nanoporous zinc foam.

According to a first aspect, the present invention provides a hyper-dendritic nanoporous zinc foam useful in an electrode, which is preferably an anode. The zinc foam is a three-dimensional network of dendrites which is electrochemically active and electronically conductive, including at the nanoscale. Thus, in certain preferred embodiments the zinc foam electrode is a nanoporous zinc structure comprising both primary dendrites, and secondary dendrites.

Preferred embodiments of hyper-dendritic nanoporous zinc foam exhibit a specific surface area of zinc foam which is preferably at least 2 times larger, more preferably at least 3, (and in order of increasing preference) 4, 5, 10, 15, 20, 25 and even greater times larger than bulk zinc. This high relative surface to volume ratio of the zinc foam provides for a better and more uniform charge distribution, better charge capacity retention over multiple charge-discharge cycles, and longer effective lifespan in a rechargeable battery.

Preferred embodiments of hyper-dendritic nanoporous zinc foam electrode retain a significant capacity retention over a large number of cycles, e.g., about 100, or even more charge-discharge cycles ("cycles"). Preferably a hyper-dendritic nanoporous zinc foam electrode retains at least about 80%, (and in order of increasing preferably, at least about 80.5%, 81%, 81.5%, 82%, 82.5%, 83%, 83.5%, 84%, 84.5%, 85%, 85.5%, 86%, 86.5%, 87%, 87.5%, 88%, 88.5%, 89%, 89.5%, 90%, 90.5%, 91%, 91.5%, 92%, 92.5%, 93%, 93.5%, 94%, 94.5%, 95%, 95.5%, 96%, 96.5%, 97%, 97.5%, 98%, 98.5%, and 99%) of the charge capacity of the electrode at it first charge of a charge-discharge cycle, especially preferably when measured at a 40% depth-of-discharge (DOD) level.

The dendritic nanoporous zinc foam electrode (preferably anodes) are preferably initially operated at states far from equilibrium (e.g., cathodic overpotentials from about 200 to about 600 mV) and may be thereafter successively charged and discharged, viz., "cycled", towards equilibrium. The dendritic nanoporous zinc foam electrode, upon recharging of a battery at standard operating conditions may densify the structure of the electrode and in particular the zinc and suppress the initiation of the formation of dendrites if the three-dimensional core of the structure of the electrode is kept intact. It is foreseen that rechargeable batteries which comprise hyper-dendritic nanoporous zinc foam electrode can undergo at least about 50 cycles, preferably more than 50, and particularly preferably at least about 50 to 300 cycles without failure by reversion to particulate zinc.

In certain particularly preferred embodiments, the zinc foam exhibits generation effiency at high coulombic efficiency (about 87.7±1.5%, balance $H_2$ (g) generation) and secondary anode performance beyond 100 cycles at 40% DOD with greater than 98% coulombic efficiency if used on a 1 to 5 hour charge/discharge basis. The superior performance is attributed to the three-dimensional dendritic matrix at nanoscale formed by branch growth on secondary dendrites. The branch formation of the zinc foams result in zinc nanoparticles with a size distribution of about 54.1-96.0 nm. The achieved nanoparticles contributed to: more rapid kinetics in comparison with conventional bulk zinc of the redox chemistry, about 10-25 times larger specific surface area than bulk zinc, an a 2.8° C. decrease in melting point in comparison with bulk zinc formed and a highly oriented zinc deposition.

In preferred embodiments the hyper-dendritic nanoporous zinc foam is substantially pure zinc, that is to say consists of at least 99% wt. zinc., preferably consists of at least 99.5% wt, and especially preferably consists of 99.9% or even 99.99% or more (e.g., 100%) zinc. A feature of the hyper-dendritic nanoporous zinc foam is that they do not require additives to suppress hydrogen and control the morphological uniformity of zinc deposition, and polymeric binders to keep zinc particles intact as are commonly used in prior art processes and are frequently present with prior art zinc anodes.

In a second aspect the present invention provides methods of producing a hyper-dendritic nanoporous zinc foam electrode, which is preferably an anode. An advantageous feature of the hyper-dendritic nanoporous zinc foam electrodes are that they are preferably formed in situ which provides for high degree of control over the structure and morphology of the electrode, e.g., anode.

From the art is known that zinc metal is soluble in strong alkaline solutions and equilibrates with zincate ions, $Zn(OH)_4^{2-}$, at pH values >12. The charge and discharge reaction of zinc electrodes, the precipitation of ZnO at supersaturated concentration of zincate ions and hydrogen evolution are shown in the following equations (1), (2) and (3), respectively:

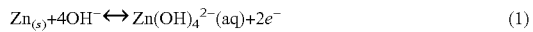

$$Zn_{(s)} + 4OH^- \leftrightarrow Zn(OH)_4^{2-}(aq) + 2e^- \qquad (1)$$

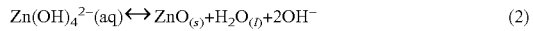

$$Zn(OH)_4^{2-}(aq) \leftrightarrow ZnO_{(s)} + H_2O_{(l)} + 2OH^- \qquad (2)$$

$$H_2O_{(l)} + 2e^- \leftrightarrow H_2(g) + 2OH^- \qquad (3)$$

Zinc has an equilibrium potential that is about 0.4 V lower than the equilibrium potential of hydrogen evolution at pH 14 thus having a direct influence on the efficiency of electrodeposited zinc. The morphology of electrodeposited zinc is dependent on the intermediate product zincate. Precipitation of zincate at the surface interface generally initiates dendritic morphologies at limiting current densities due to non-uniform concentration gradients.

Figure 1B:
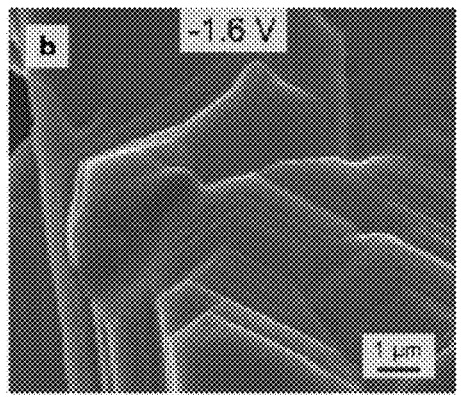
Figure 1C:
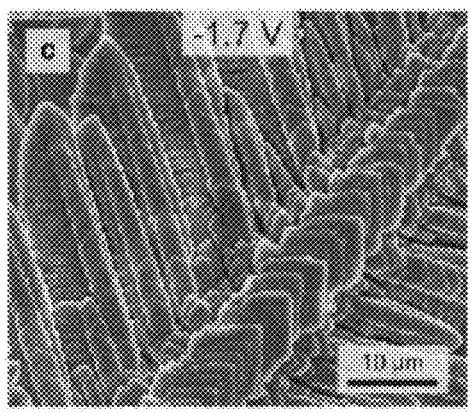
Figure 1D:
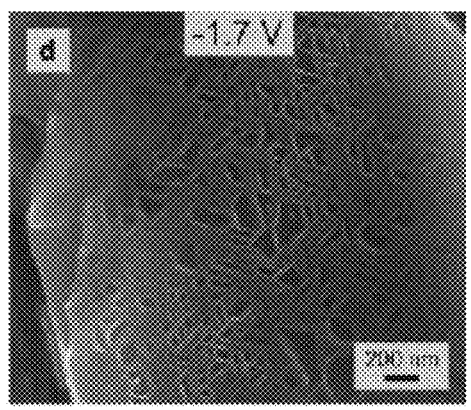
Figure 1E:
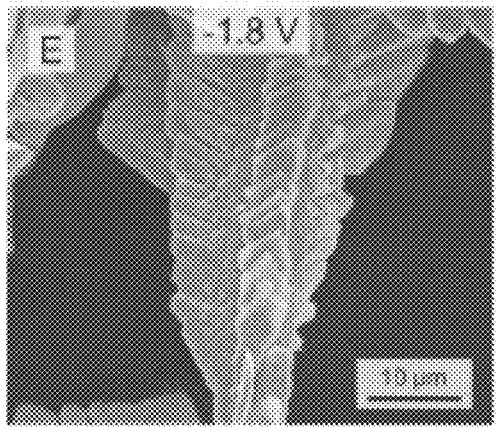
Figure 1F:
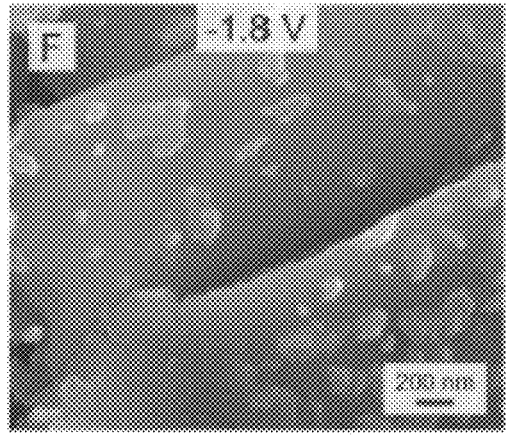
Figure 1G:
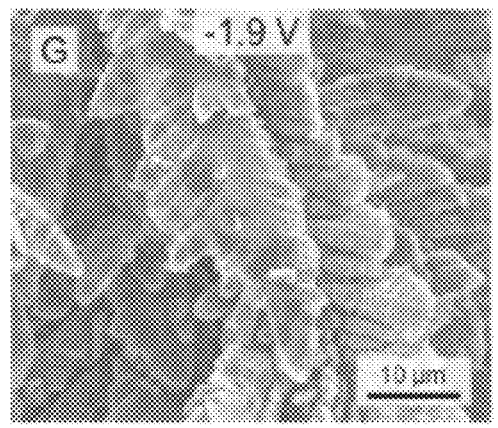
Figure 1H:
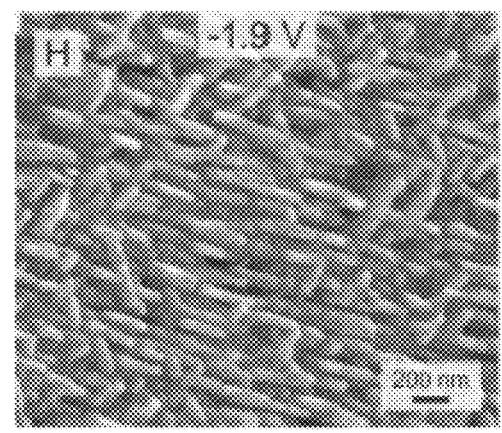
Figure 1I:
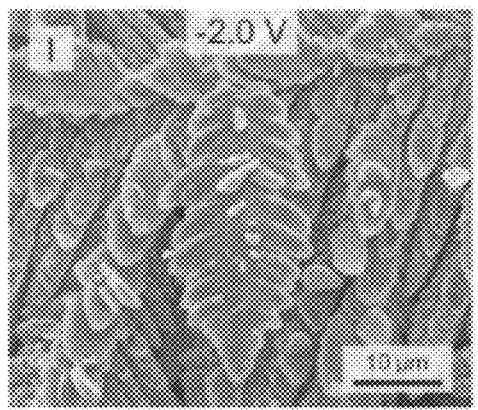
Figure 1J:
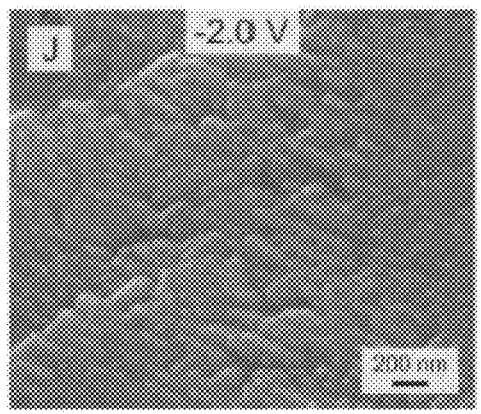

Examples of the morphology of deposited zinc formed by electrochemical deposition are illustrated in FIGS. 1A-1F in which are depicted SEM images of electrodeposited zinc in alkaline solution: in FIGS. 1A and 1B deposited at −1.6V versus Hg/HgO, in FIGS. 1C and 1D deposited at −1.7V versus Hg/HgO, in FIGS. 1E and 1F, deposited at −1.8V versus Hg/HgO in FIGS. 1G and 1H, deposited at −1.9V versus Hg/HgO, and in FIGS. 1I and 1J, deposited −2.0 V versus Hg/HgO. Hexagonal crystals organized into fernlike dendrites with particles sized between 2 and 10 μm are shown in FIGS. 1A, 1B, 1C and 1D. At high cathodic overpotentials (4~500 mV, assuming an equilibrium potential of zinc at −1.38 V), oriented zinc pillars were formed at nanoscale, seen in FIGS. 1H and 1J, with a mean particle size of 73.05±8.95 nm measured from 49 randomly selected zinc particles.

For each particular electrochemical system used in an electrodeposition process, a maximum limiting current can be calculated from the components making up each electrochemical system, viz. a 'calculated theoretical limiting current', for a given electrical potential applied across the electrodes of said system, and for each said system, a maximum limiting current, viz., 'calculated theoretical maximum electrical potential' can also be determined. According to the prior art, any increase in the current or potential across the electrodes in such a system which are in excess of the calculated theoretical limiting current and/or the calculated theoretical maximum electrical potential are not expected to occur as no additional electrical current may pass between the electrodes, and thus no practical benefit is expected to be achieved by exceeding the calculated theoretical limiting current and/or the calculated theoretical maximum electrical potential. Surprisingly the present inventors have discovered that this is not the case, and that providing an excess electrical potential across the electrodes in such a system which is in excess of the calculated theoretical maximum electrical potential, referred to herein as the 'electrical overpotential' provides for an improved process for the in situ deposition of zinc onto an electrode, and wherein the deposited zinc forms a hyper-dendritic nanoporous zinc foam thereon having unexpectedly good technical characteristics as described in more detail herein. This hyper-dendritic nanoporous zinc foam formed is a three-dimensional network of dendrites that is electrochemically active and electronically conductive, at the nanoscale. Conductive paths throughout the internal structure result in a more uniform current distribution: reducing non-uniform concentration gradients and anode polarization losses. The nanoporous zinc structure also presents a modified activation energy for electrochemical cycling.

In preferred embodiments the in situ electrodeposition process is operated at or near (preferably within 10% or less of) the (calculated, or actual,) limiting current for a particular electrochemical system used in an electrodeposition process, but at an electrical overpotential which is an electrical potential which is in excess of the calculated or actual limiting current for the said system. Once the limiting current threshold is reached such an electrical overpotential has essentially no upper limit other than one which would cause a failure in one or more components or elements of the electrodeposition system in which the electrodeposition process occurs. Advantageously the electrical overpotential exceeds the potential at which the limiting current density is achieved for the said system by at least about 0.25%, and preferably (in order of increasing preference) by at least about 0.5%, 0.75%, 1%, 2, 3%, 4%, 5%, 6%, 7%, 8%, 9%, 10, 15%, 20%, 25%, 30%, 35%, 40%, 45%, 50%, 60%, 70%, 80%, 90%, 100%, 125%, 150%, 175%, 2005, 225%, 250%, or more.

The provision of such an electrical overpotential is essential to the process for forming the hyper-dendritic nanoporous zinc foam which is deposited on a substrate or structure to form an electrode, preferably an anode. The thus formed the hyper-dendritic nanoporous zinc foam may be structurally distinguishable and/or functionally distinguished from prior art zinc anodes.

Figure 2A:
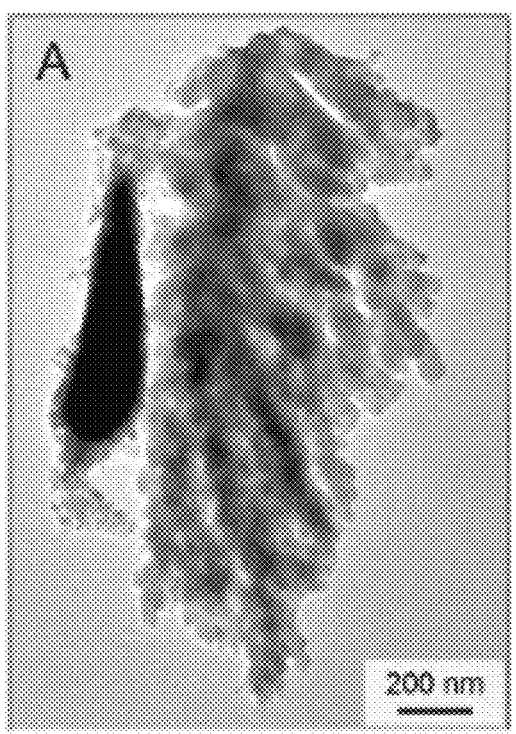
FIG. 2A is a photomicrograph of an electrochemically deposited hyper-dendritic porous zinc foam.

FIG. 2A is a TEM image, taken at nanoscale, of an electrochemically deposited hyper-dendritic porous zinc foam formed according to the invention, formed at −2.0V vs. Hg/HgO. As is seen therefore, the morphological characteristic reveal that has the ovepotential increases the characteristic length of the dendrite decreases. At below 100 nm, the length of the dendrite is insignificant compared to the battery separator distance.

Figure 2B:
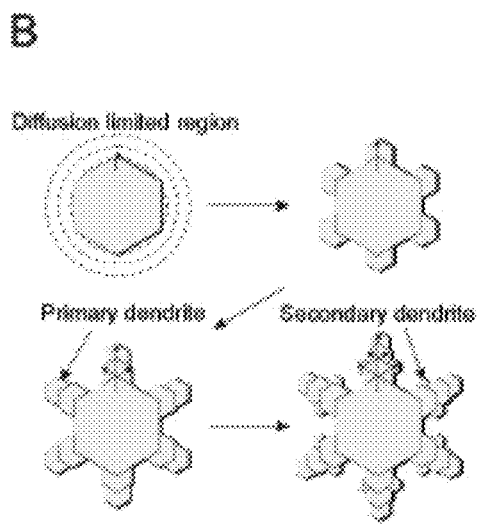
FIG. 2B is a schematic diagram of a zinc dendrite formation.

FIG. 2B is a schematic diagram of a zinc dendrite formation, illustrating the morphology of both primary and secondary dendrites on a core.

Zinc has an equilibrium potential that is about 0.4 V lower than the equilibrium potential of hydrogen evolution at pH 14 thus having a direct influence on the efficiency of electrodeposited zinc. In certain of the experiments disclosed below, the metallic foam structure was achieved at potentials applied above −2.0 V vs. Hg/HgO and a substantial amount of hydrogen evolved with zinc foam was observed. Further, in all described experiments were observed coulombic efficiencies of 84.9±3.1%, indicating a similar fraction of current formed H2(g) at each test.

Figure 3:
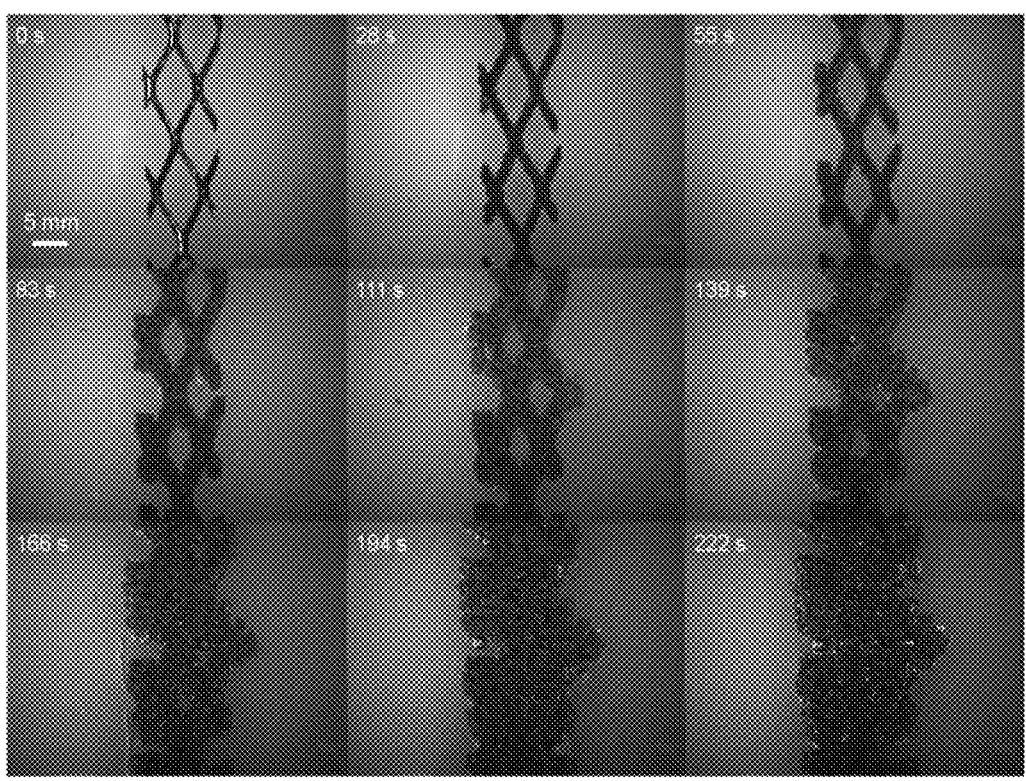
FIG. 3 depicts a chronological succession of frames of a a time-lapse microscopy movie of the growth of a hyper-dendritic zinc foam.

FIG. 3 depicts in chronological succession selected frames at 0 seconds, 20 sec., 55 sec., 83 sec., 111 sec, 139 sec., 166 sec., 194 sec. and 221 sec. of a time-lapse microscopy movie of the growth of a hyper-dendritic zinc foam on a nickel mesh current collector at −2.0 V Hg/HgO.

The deposited zinc structures illustrated on the foregoing figures where produced in accordance with the specific process parameters as identified to be relevant to each specific figure, and otherwise generally in accordance with the electrochemical deposition processes described hereinafter, particularly with reference to the examples.

The hyper-dendritic nanoporous zinc foam electrodes may be formed by in the electrodeposition on a suitable substrate or structure to form an electrode. Zinc is commonly used in anodes, and thus in preferred embodiments the electrode formed according to the process disclosed herein is useful as an anode in an electrochemical cell, especially a rechargeable battery.

An advantage of the process taught herein is that the formation of the electrode by in situ electrodeposition of zinc onto a substrate provides for the formation of an effective zinc comprising electrode which does not require any other materials, e.g., binders which are conventionally used in the formation of non-nanoporous zinc electrodes as are typically required of prior art zinc electrode formation processes which utilize zinc composites, pastes and/or powders and which do not result in a hyper-dendritic nanoporous zinc foam electrode as taught herein. Thus, the in situ process of the invention permits for the use of essentially pure zinc in the electrodeposition process used to form the hyper-dendritic nanoporous zinc foam electrode and other materials, e.g, binders, may be omitted. Such provides for improved control over the structure of the hyper-dendritic nanoporous zinc foam electrodes and its composition, and the exclusion of non-zinc other materials provides for a an essentially pure zinc deposited layer. Such also provides for an increased degree of control over the formation of the dendrites.

The hyper-dendritic nanoporous zinc foam may by an electrochemical process, i.e., an electrochemical deposition process from an alkaline electrolyte which includes a zinc species. A non-limiting example of a suitable electrolyte is an aqueous alkaline electrolyte composition which includes a 8.9 molar concentration of potassium hydroxide and 0.61 molar concentration of zinc oxide. Non-limiting examples of further suitable electrolytes which may be used include other basic supporting elecrolytes containing any mixture of KOH, LiOH and NaOH, acidic electrolytes of $ZnSO_4$, $ZnCl_2$, $ZnBr_2$, $Zn(NO_3)_2$ up to saturation in concentrated $H_2SO_4$, HCl, HBr and $HNO_3$, and aprotic solvents with halide bearing anions with, $ZnCl_2$, $ZnBr_2$ It is to be understood that virtually any suitable electrolyte may be used in the process of the invention. Formation of the hyper-dendritic nanoporous zinc foam occurs due to the abstraction of zinc from the electrolyte and its deposition on a substrate or structure present in the electrolyte as well, under suitable potentiostatic charging conditions. Such may be used to form an anode, or if desired, following its production the hyper-dendritic nanoporous zinc foam may be later separated from the substrate or structure upon which it was deposited and recovered as a separate product, e.g, a powder. Thus, the zinc foam may be used in an ex situ application. In such an application the recovered zinc foam may be used to form an electrode, i.e., an anode of a particular form or shape, which is subsequently introduced into the construction of a battery, particularly a rechargeable battery.

Thus according to the processes of the present invention, hyper-dendritic nanoporous zinc foam may be used in the construction of one or more anodes of known art primary batteries or secondary batteries, whether such anodes are formed in situ or are formed ex situ. Thus, conventional zinc anodes for both primary and secondary type electrical cells presently known to the art may be replaced by anodes comprising hyper-dendritic nanoporous zinc foam as disclosed herein.

While the charge imparted to the system containing the electrolyte may vary, it is formed using an electrical overpotential which is an electrical potential which is in excess of the calculated theoretical maximum electrical potential for the said system. The duration of the process may vary and may be used to control the degree and/or amount of deposition of the hyper-dendritic nanoporous zinc foam upon the substrate or structure present in the electrolyte as may be desired. For example, in an aqueous alkaline electrolyte composition which includes a 8.9 molar concentration of potassium hydroxide and 0.61 molar concentration of zinc oxide, the zinc foam is formed in potentiostatic charging conditions at −2.0 volt versus mercury/mercury oxide and higher, in a three-electrode setup consisting of a platinum or nickel working electrode, a mercury/mercury oxide reference electrode and a platinum or nickel counter electrode. For in situ purposes, the zinc anode is kept in solution—for ex situ purposes, the sample is rinsed three times in 8.9 molar potassium hydroxide to ensure dissolution of zinc oxide, neutralized in deionized water five times, and then dried under vacuum for one hour at 110° C.

A still further advantageous feature of the hyper-dendritic nanoporous zinc foam comprising electrodes are that they may be regenerated or reformulated, in situ, within a battery, if necessary or desired. Such does not require disassembly of the battery or withdrawal of the hyper-dendritic nanoporous zinc foam comprising electrode therefrom. The regeneration of the zinc foam within a primary or secondary battery may be accomplished by methods including by not limited to pulse plating, reverse pulse plating, high duty cycle plating against a stable counter electrode such as NiOOH, $Br_2(l)$, and CuFeHCN.

In a third aspect, the present invention provides methods for the use of the disclosed hyper-dendritic nanoporous zinc foam containing electrodes, preferably anodes, including their use in electrochemical cells, especially in rechargeable electrical batteries. The regeneration of the zinc foam within a primary or secondary battery may be accomplished by methods including by not limited to pulse plating, reverse pulse plating, high duty cycle plating against a stable counter electrode such as NiOOH, Br2(l), and CuFeHCN under suitable conditions.

As stated previously the hyper-dendritic nanoporous zinc foam may be used in forming electrodes, particularly anodes of the type which are known to the art to be useful in both primary and particularly preferably in secondary batteries. Such batteries may be sealed or may be openable, e.g, to replenish the electrolyte. The electrolyte may be of a solid, paste, gel or liquid form, but is preferably a substantially aqueous electrolyte composition of a suitable composition. The hyper-dendritic nanoporous zinc foam may form only a part of an electrode, e.g, as may be fabricated according to an ex situ process discussed herein, or may form a part of an electrode formed by an in situ process, wherein the hyper-dendritic nanoporous zinc foam is deposited on a suitable substrate or structure and thereafter utilized. Such batteries may also include one or more further electrodes, in addition to the electrode which comprises the hyper-dendritic nanoporous zinc foam. Such further electrodes may be formed of any suitable material and may assume any suitable or desired physical configuration. The disclosed hyper-dendritic nanoporous zinc foam containing electrodes are considered to be particularly useful in primary and secondary batteries of the type which includes zinc forming part of or the substantial entirety of one or more electrodes present within the battery.

Such include static batteries, redox flow batteries such as ZnBr and ZnFe, semi-solid fuel cells, and flow-assisted cell designs. Useful are also batteries are those wherein the active material in the electrodes can be refreshed on a periodic The use of the hyper-dendritic nanoporous zinc foam containing electrodes in secondary batteries is particularly preferred due to the unique technical characteristics of the hyper-dendritic nanoporous zinc foam itself, particularly with regard to efficiency in its operation over multiple cycles.

EXAMPLES

The deposited zinc compositions discussed with reference to the figures were produced generally in accordance (unless otherwise indicated with reference to a particular figure) with the following protocols and/or evaluated according to the following protocols described hereinafter.

Experimental processes were carried out in alkaline conditions where 8.9 M KOH pellets (Sigma-Aldrich, St Louis, Mo., USA) and 0.61 M ZnO (Sigma-Aldrich) were dissolved in deionized (DI) water and stirred overnight. The zinc foam was prepared electrochemically from flooded undivided cells containing 10 ml of electrolyte in a three-electrode setup that was controlled by a potentiostat (Keithley Model 2401 Low Voltage SourceMeter Instrument, Keithley Instruments Inc., Cleveland, Ohio, USA). The setup consisted of a 0.5-mm diameter platinum wire (Sigma-Aldrich) working electrode, an Hg/HgO reference electrode (Koslow Scientific Company, Englewood, N.J., USA) and a nickel mesh (Dexmet Corporation, Wallingford, Conn., USA) that served as a counter electrode. Electrodeposited zinc on a platinum wire was controlled with a defined charge passed of 100 coulombs (C), using a controlled-potential coulometry method and a surface area of 0.260 cm2. For studies of the rechargeability of the zinc foam, the working electrode was prepared with a charge passed of 3000 C, and a conventional nickel electrode with excess capacity served as the counter electrode. The platinum electrode was initially activated and cleaned by dipping it in nitric acid (Sigma-Aldrich) for 1 h at 60° C., and then rinsed with DI water. The nickel electrode was prepared by mixing a slurry consisting of 50 wt. % NiOOH (Sigma-Aldrich), 40 wt. % graphite (Timcal Timrex KS6, Imerys Graphite & Carbon, Bodio, Switzerland) and 10 wt. % PTFE (Sigma-Aldrich), and the resulting paste onto a flat surface using a rolling pin. The rolled electrode was then dried in a vacuum oven at 125° C. for 2 h. The assembly was compressed in a uniaxial press using 4 tons of force on a nickel mesh current collector. The full cell was sandwiched between two layers of non-woven cellulose membrane (Freudenberg), and topped up with either 10 ml electrolyte for flooded cells or 1 ml electrolyte for non-flooded cells. The uncompensated resistance, $R_u$ was evaluated for each setup in this work through a current interrupt method. The $R_u$ values obtained were under $4\Omega$ for all methods and hence neglected, due to the absence of any significant effect on the measured potential. For in situ studies, the zinc was kept in solution. For ex situ studies, the sample was rinsed three times in 8.9 M KOH to ensure the dissolution of ZnO, neutralized with DI water five times, and then dried under vacuum for 1 h at 110° C. The samples were prepared by grinding with mortar, pestle and small amounts of acetone until a fine powder was obtained. Purum bulk zinc powder (Sigma-Aldrich) was used as a standard comparison.

Figure 4:
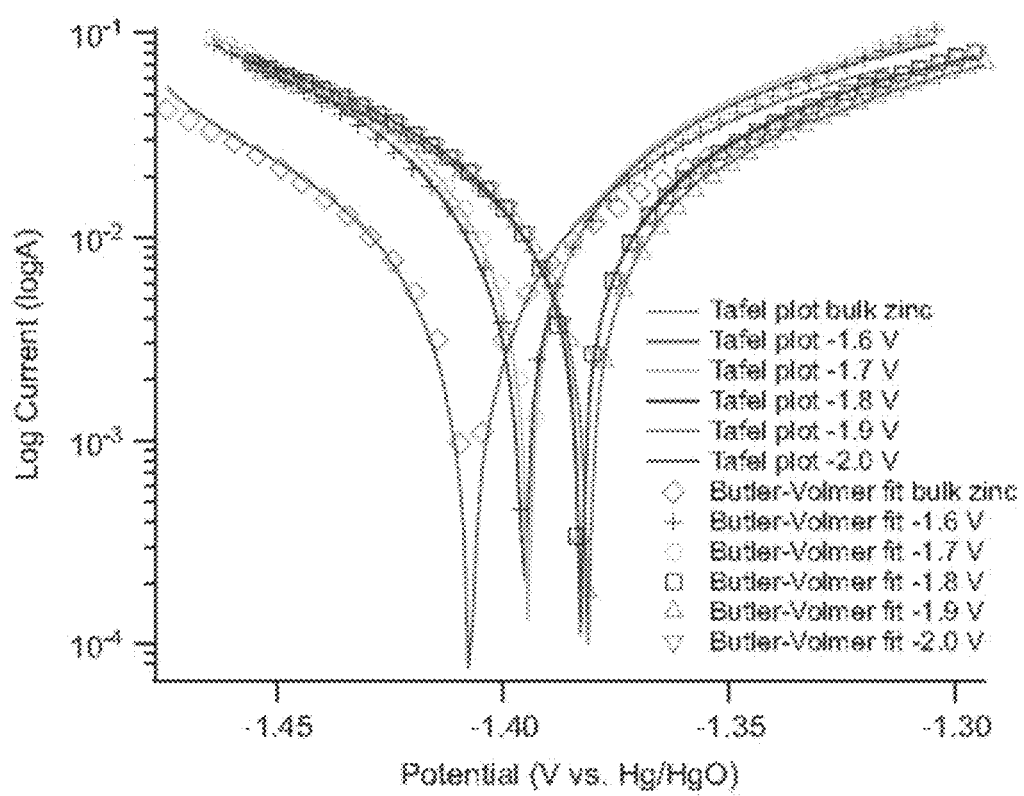
FIG. 4 illustrates a Tafel plot and Butler-Volmer fit of electrodeposited zinc at different potentials and standard bulk zinc.

Tafel studies (see FIG. 4) were carried out using a 0.5-mm thick zinc foil with a surface area of 0.260 $cm^2$ (Sigma-Aldrich) cleaned in 10 wt. % sulfuric acid (Sigma-Aldrich) and rinsed with DI water. FIG. 4 illustrates a Tafel plot and Butler-Volmer fit of electrodeposited zinc at different potentials and standard bulk zinc. The lines show the experimental data and the markers show the calculated fit.

Scanning electron microscopy (SEM) images depicted in one or more of the Figures, and elemental composition quantifications were assessed by an FEI Quanta 200 FEG Environmental SEM (FEI, Hillsboro, Oreg., USA) connected with an integrated electron diffraction spectroscopy system.

High-resolution transmission electron microscopy (TEM) images depicted in one or more of the Figures were taken by a Philips CM200 FEG-TEM operating at an accelerating voltage of 200 kV. The samples were attached onto a lacey carbon support film on a gold 200 mesh grid (Electron Microscopy Sciences, Hatfield, Pa., USA). An OptixCam OCS-1.3 optical microscope (The Microscopic Store, LLC, Roanoke, Va., USA) was used to image the zinc foam growth on a nickel mesh current collector.

BET surface area measurements were carried out using a Micromeritics ASAP 2010 apparatus (Micromeritics Instrument Corporation, Norcross, Ga., USA) using nitrogen as an adsorbent. The samples were prepared by heating overnight at 20° C. while flowing $N_2$ gas. The $N_2$ adsorption was measured from a relative pressure range of 0.01-1 at 77.3 K.

Differential scanning calorimetry (DSC) measurements were performed using a Perkin-Elmer Pyris 1 DSC (PerkinElmer Inc., Waltham, Mass., USA) with a process scheme of rapid isothermal treatment to 340° C. in 5 min and then heated at rate of 1° C./min up to 440° C. at ambient pressure in argon atmosphere.

High resolution X-ray diffraction patterns were taken at room temperature with a Bruker D8 Discover X-ray Diffractometer (Bruker Corporation, Billerica, Mass., USA) and in 0.2° intervals with 1 s settling time using a Cu—Kα source operating at 40 kV and 40 mA.

The elemental composition of the samples formed and depicted in FIGS. 1A, 1B, 1C, 1D, 1E, 1F, 1G, 1H, 1I and 1J were analyzed with EDS. A small amount of the oxide was formed: 3.2%, 3.8%, 5.9%, 6.5% and 8.2 wt. %, in increasingly negative potentials, respectively. The amount of potassium was below 0.6 wt. % for all measurements thus were kept in solution at an opencircuit voltage for 1 h to relax the surface. Afterwards, polarization curves were swept linearly from −80 to 80 mV in overpotentials at a sweeping rate of 1 mV s-1. The kinetic parameters of zinc were calculated through the Butler-Volmer equation at electrontransferred limited regions. The Butler-Volmer relationship is seen in formula (4)

$$I = I_0 A \left( \exp\left[\frac{(1-\alpha_C)nF\eta}{RT}\right] - \exp\left[-\frac{\alpha_c nF\eta}{RT}\right] \right) \quad (4)$$

where $I_0$ is the exchange current, $\eta$ the activation overpotential, $\alpha_c$ the cathodic charge transfer coefficient.

FIG. 4 shows the measured Tafel plots and Butler-Volmer fits at different potentials. Calculated kinetic parameters are given for the different potentials in the following Table 1:

TABLE 1

Measured kinetic parameters for electrodeposited zinc from Butler-Volmer fit to Tafel slope at different potentials

| Kinetic parameters | Bulk zinc | −1.6 V | −1.7 V | −1.8 V | −1.9 V | −2.0 V |
| --- | --- | --- | --- | --- | --- | --- |
| $I_0$ (mA) | 12.9 ± 0.5 | 19.4 ± 1.3 | 26.1 ± 2.0 | 34.6 ± 6.7 | 29.0 ± 5.6 | 36.8 ± 4.3 |
| $\alpha_a$ (—) | 0.45 ± 0.01 | 0.41 ± 0.02 | 0.49 ± 0.01 | 0.67 ± 0.04 | 0.66 ± 0.04 | 0.69 ± 0.06 |
| $\alpha_c$ (—) | 0.55 ± 0.01 | 0.59 ± 0.02 | 0.51 ± 0.01 | 0.33 ± 0.04 | 0.34 ± 0.04 | 0.31 ± 0.06 |
| Anodic Tafel slope (mV/dec) | 125.6 ± 7.5 | 123.5 ± 2.1 | 144.2 ± 3.8 | 205.3 ± 7.7 | 195.6 ± 6.9 | 212.9 ± 5.1 |
| Cathodic Tafel slope (mV/dec) | 107.3 ± 1.5 | 100.0 ± 1.7 | 116.3 ± 3.4 | 179.6 ± 7.0 | 175.2 ± 5.5 | 190.1 ± 4.7 | negligible. Such indicates that the deposited zinc foam was substantially pure, viz, contained not more than 1% non-zinc materials or compounds. The hyper-dendritic nanoporous zinc foam prepared at −2.0 V was further investigated under a TEM, and the image is presented in FIG. 2A. A schematic representation of the inventors' hypothesized zinc dendrite formation, based on a diffusion-limited aggregation model is seen in FIG. 2B. While not wishing to be limited to the following, the inventors believe that branch growth on secondary dendrites at the edge of the primary dendritic spines led to the formation of nanoporous zinc. The growth of these branches may be the cause of three-dimensional threadlike networks consisting of zinc particles. A mean particle size of 72.15±18.05 nm was assessed from the TEM image based on 72 randomly selected zinc nanoparticles. Typical 'large' zinc hexagonal crystals were no longer evident due to the initiation of numerous branches resulting in spherical boundaries, but rather we see small defective zinc hexagonal aggregates.

The inventors observed that the hyper-dendritic nanoporous zinc foam was observed to grow in an isotropic manner at the micron scale as shown in the time-lapse movie of zinc foam growth on nickel mesh in FIG. 3. This was surprising and counterintuitive as one expects an 'electrochemical lighting rod' type morphology under these conditions, but upon inspection these fast directional growths are occurring, just at the nanometer scale. In concert, the exploitation of the small directional growth from edge facets seems to result in a micron scale morphology of randomly oriented particles. This growth then continues, apparently creating a conformal 'hyper-dendritic' foam, as is illustrated in one or more of the Figures.

The kinetics of electrodeposited zinc at varying potentials were evaluated in operando, in comparison with a standard bulk zinc sample, by first depositing zinc on platinum at a constant potential with a charge passed of 100 C to ensure a thick layer of deposited metal for all samples. The samples At applied potentials above −1.6 V, more rapid kinetics were evident: we observed an increased exchange current of 36.8±4.3 mA at −2.0 V in comparison with 12.9±0.5 mA for the standard. In addition to the evidence of more rapid kinetics, the anodic and cathodic Tafel slopes were calculated at 212.9±5.1 and 190.1±4.7 mV dec-1 at −2.0 V in comparison with 125.6±7.5 and 107.3±1.5 mV dec-1 for the standard. The kinetic transition led to a lower activation energy at potentials of −1.8 to −2.0 V and may have occurred because the nucleation of zinc particles on the edge (branch formation) was more probable than the continuous growth of existing primary dendrites. The anodic reaction, the oxidation of Zn0 to $Zn(OH)_4^{2-}$, was also dominant. The anodic and cathodic charge transfer coefficients of 0.69±0.06 and 0.31±0.06 at −2.0 V, compared with 0.45±0.01 and 0.55±0.01 for the standard, indicated the oxidation reaction being dominant.

A lower equilibrium potential was measured for the samples prepared above the potentials of −1.8 V ($E_0$=−1.38 V) in comparison with the ones prepared under potentials of −1.7 V ($E_0$=−1.395 V) and the bulk sample ($E_0$=−1.41 V).

The $N_2$ adsorption-desorption isotherms of electrodeposited hyperdendritic nanoporous zinc foam at −2.0 V were measured. A specific surface area of 12.16±0.62 $m^2$ $g^{-1}$ was obtained from the pressure range of $0.05<P/P_0<0.3$. In contrast to bulk zinc, which has a specific surface area of 0.5-1$^{m2}$ $g^{-1}$, the specific surface area of zinc foam was 10-25 times larger. Assuming the dendrites are composed of solid, spherical particles with smooth surface in narrow size distribution and a theoretical density of 7.14 g cm-3, a mean particle size diameter of 69.10 nm was calculated from formula (5)

$$D_{BET} = 6000/\rho S_{BET} \quad (5)$$

where $\rho$ is the theoretical density in g/cm$^3$ and SBET is the specific surface area in $m^2$ $g^{-1}$. This is in agreement with what was observed in the TEM.

Figure 5:
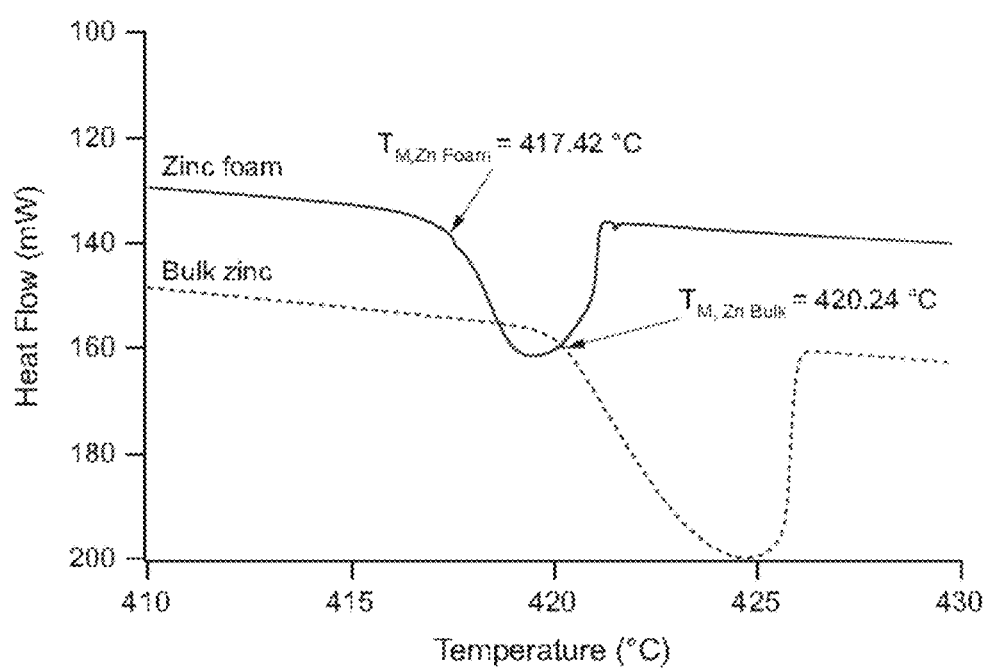
FIG. 5 depicts a graph of Heat flow vs temperature from DSC measurements of nanoporous zinc foam.

DSC profiles of prepared hyper-dendritic zinc foam and conventional bulk zinc are seen in FIG. 5, presenting a melting-point depression of the zinc foam because of reduction in particle size. In FIG. 5 is graphically illustrated the Heat flow vs temperature from DSC measurements of nanoporous zinc foam produced from −2.0 V vs Hg/HgO (solid line) in comparison with bulk zinc (dashed line). The onset indicated the melting point of both of these metals. The thermograms showed a dip in heat flow, which indicated an endothermic phase transition. A decrease in heat of fusion of the zinc foam, 6.56 kJmol$^{-1}$, in contrast to the bulk zinc, 7.26 kJmol$^{-1}$, was achieved. A melting point for the zinc foam was seen at 417.42° C. and for the bulk zinc at 420.24° C.

A mean particle diameter size of 85.30 nm was calculated based on Gibbs-Thomson thermodynamic model of melting point depression for nanoparticles according to the following Formula 6:

$$d = \frac{4\gamma_{sl}}{H_f \rho_s \left(1 - \left(\frac{T_M(d)}{T_{MB}}\right)\right)} \quad (6)$$

where $\gamma_{sl}$ is the solid-liquid interfacial energy in Jm$^{-2}$, $H_f$ is the bulk heat of fusion in J g$^{-1}$, $\rho_s$ is the density of the solid in gm$^{-3}$, TMB is the bulk melting temperature in K and TM(d) is the nanoparticle melting temperature in K. All physical constants were taken from the literature and the melting points were measured from the onset of the endothermic phase transition.

Figure 6:
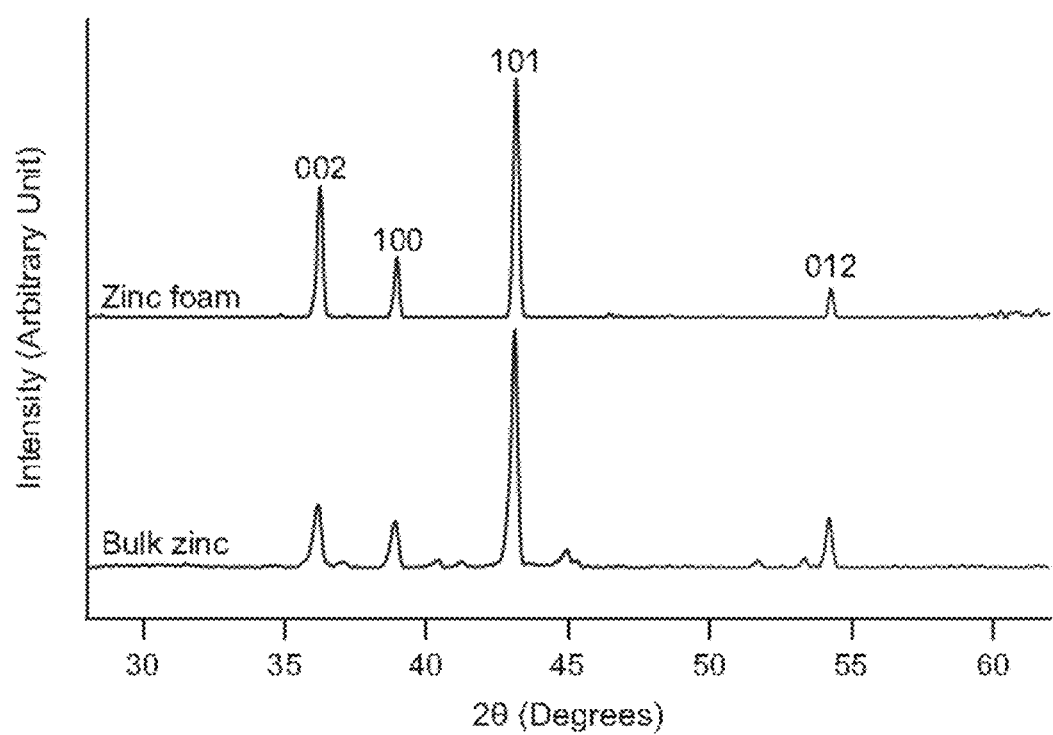
FIG. 6 illustrates the X-ray diffraction patterns of zinc foam formed according to the invention, and bulk zinc.

X-ray diffraction patterns of prepared zinc foam at −2.0 V and bulk zinc are presented in FIG. 6, which illustrates the X-ray diffraction patterns (intensity vs. 2θ) of zinc foam formed according to the invention, and bulk zinc. The patterns showed highly crystalline zinc with well-defined peaks for zinc corresponding to the lattice planes {002}, {100}, {101} and {012}. No corresponding peaks of ZnO or Zn(OH)2 were found, indicating that pure hexagonal zinc crystals were formed. An increased relative intensity of the peak at 36.29° for the zinc foam (B) compared with the bulk zinc (A) indicates that zinc was preferentially deposited in highly oriented {002} direction. X-ray peak broadening analysis was carried out through the Scherrer equation, according to the following formula (7), which estimates the mean crystallite size from the full width at half maximum of a peak:

$$d = \frac{K\lambda}{\beta \cos\theta} \quad (7)$$

where d is the mean crystallite size in nm, K is a dimensionless shape factor (0.94), λ is the diffraction wavelength in nm, β is the full width at half maximum in radians and θ is the Bragg angle in radians. Assuming Gaussian peak profiles and spherical crystals with cubic symmetry, the mean crystallite sizes were calculated to be 35.28, 36.90, 37.10 and 38.61 nm for the peaks of 36.29°, 38.93°, 43.16° and 54.28°, respectively.

Figure 7:
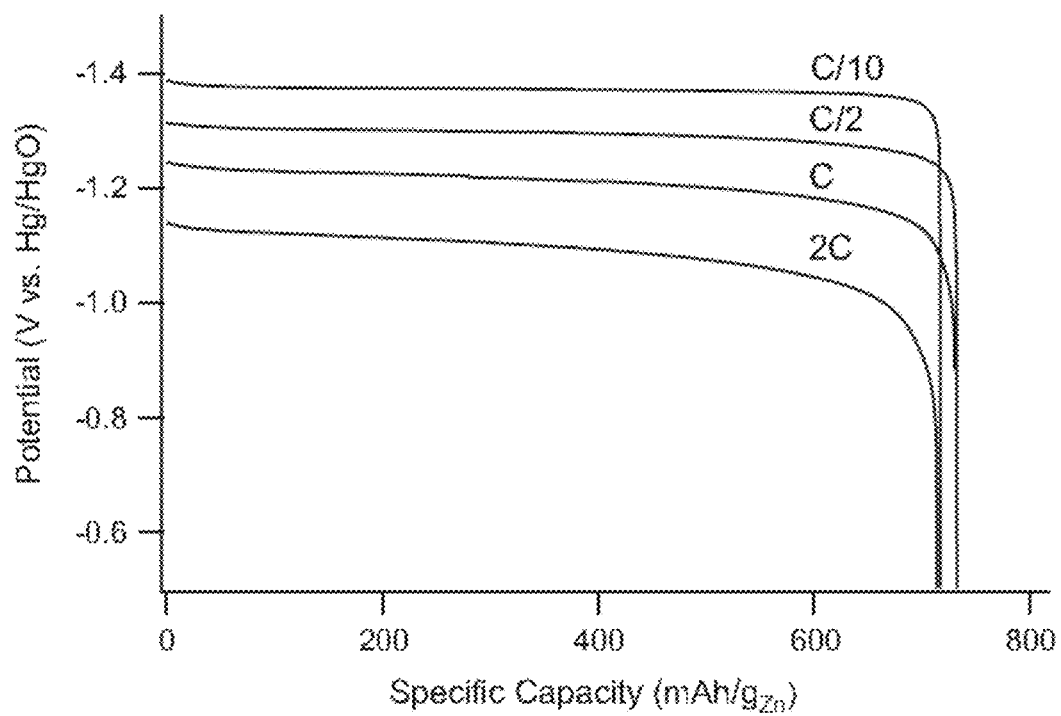
FIG. 7 depicts a graph of discharge capacity profiles as a function of rate of the hyperdendritic nanoporous zinc foam.

Discharge profiles as a function of rate of prepared zinc foam according to the invention on platinum at −2.0 V and at ambient temperature with charge passed of 3000 C is seen in FIG. 7. In FIG. 7 are illustrated Discharge capacity profiles as a function of rate of the hyperdendritic nanoporous zinc foam initially prepared in situ with charge passed of 3000 C. The discharge rates used are 2C, C, C/2 and C/10. Flat discharge-profile plateaus at −1.375 to −1.1 V and specific capacities of 719.2±12.1 mAh g$^{-1}$ corresponding to a consistent coulombic efficiency of 87.7±1.5% at discharge rates from 2C to C/10 were measured. The discharge profiles of zinc foam showed no significant decrease in discharge capacity at 100% depth-of-discharge (DOD) and at high rates. The decrease in the voltage plateau at high discharge rates was directly correlated to higher ohmic resistance. The high utilization of the hyper-dendritic nanoporous zinc foam showed great rate capability Conventional zinc anodes usually consist of active material, additives to suppress hydrogen and control the morphological unifomiity of zinc deposition, conductive additives and polymeric binders to keep zinc particles intact. In the foregoing experiments, the hyper-dendritic nanoporous zinc foam was prepared, in situ, by reducing zincate ions on a current collector with no other necessary compounds. The structural foam provided mechanical strength with an interconnected zinc current pathway throughout the core when cycled.

Figure 8A:
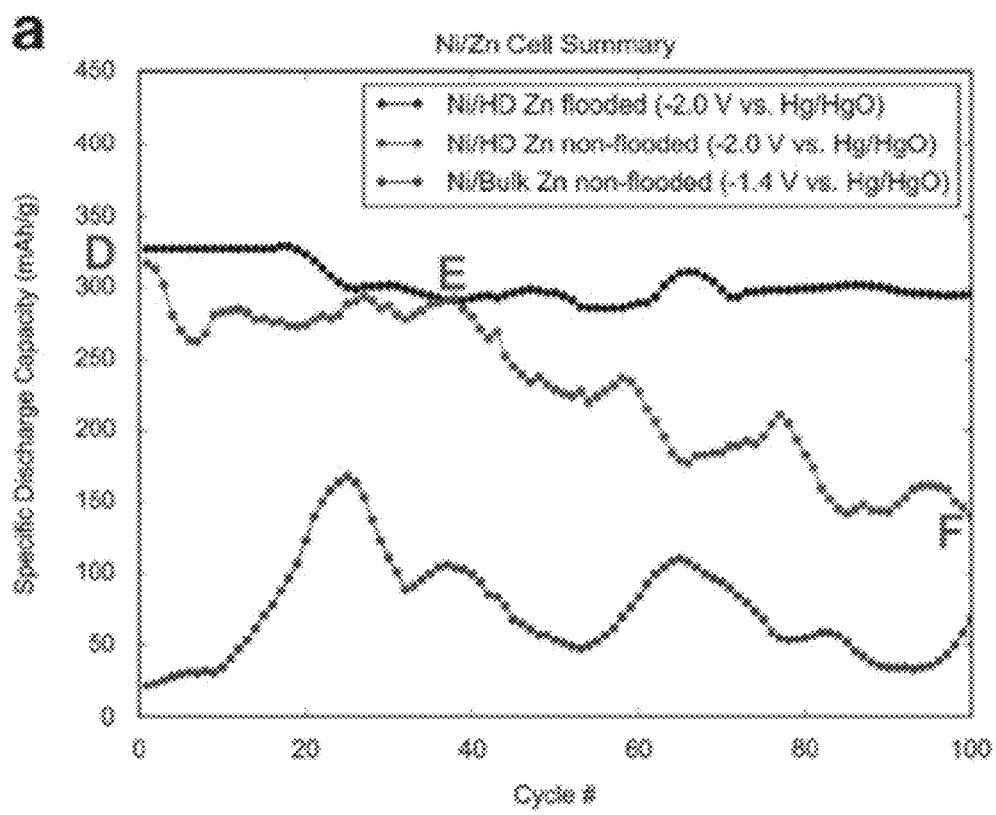
FIG. 8A depicts a graph of a cell summary of flooded and non-flooded zinc electrodes cycled against conventional nickel electrodes over 100 cycles.
Figure 8B:
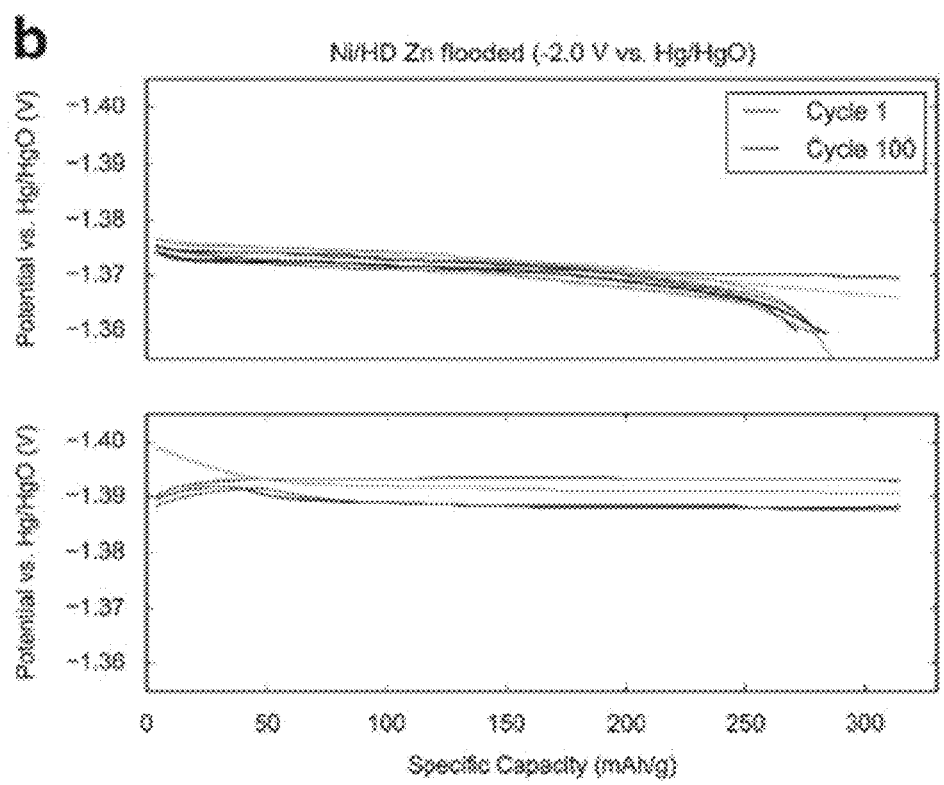
FIG. 8B depicts a graph of a galvanostatic charge-discharge cycling profiles of hyper-dendritic nanoporous zinc foam in a flooded cell at a rate of C/5 to a capacity limit of 40% DOD.
Figure 8C:
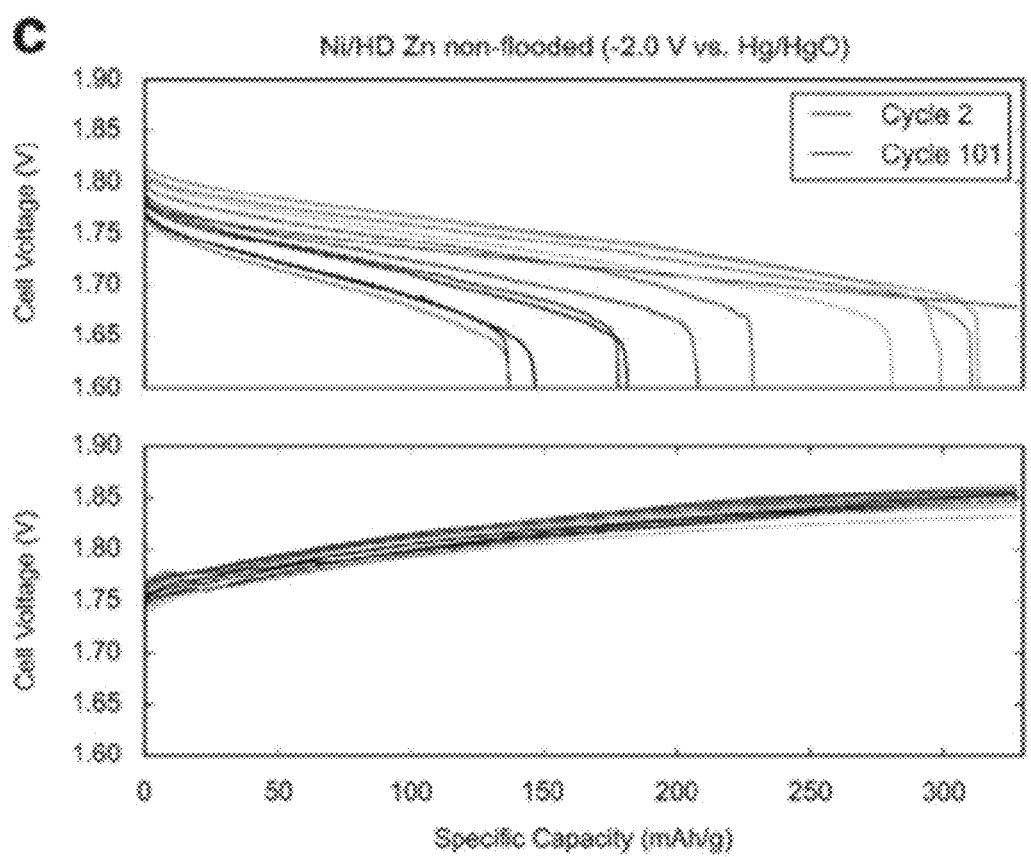
FIG. 8C depicts a a graph of a galvanostatic charge-discharge cycling profiles of hyper-dendritic nanoporous zinc foam in a non-flooded cell at a rate of C/5 to a capacity limit of 40% DOD.
Figure 8D:
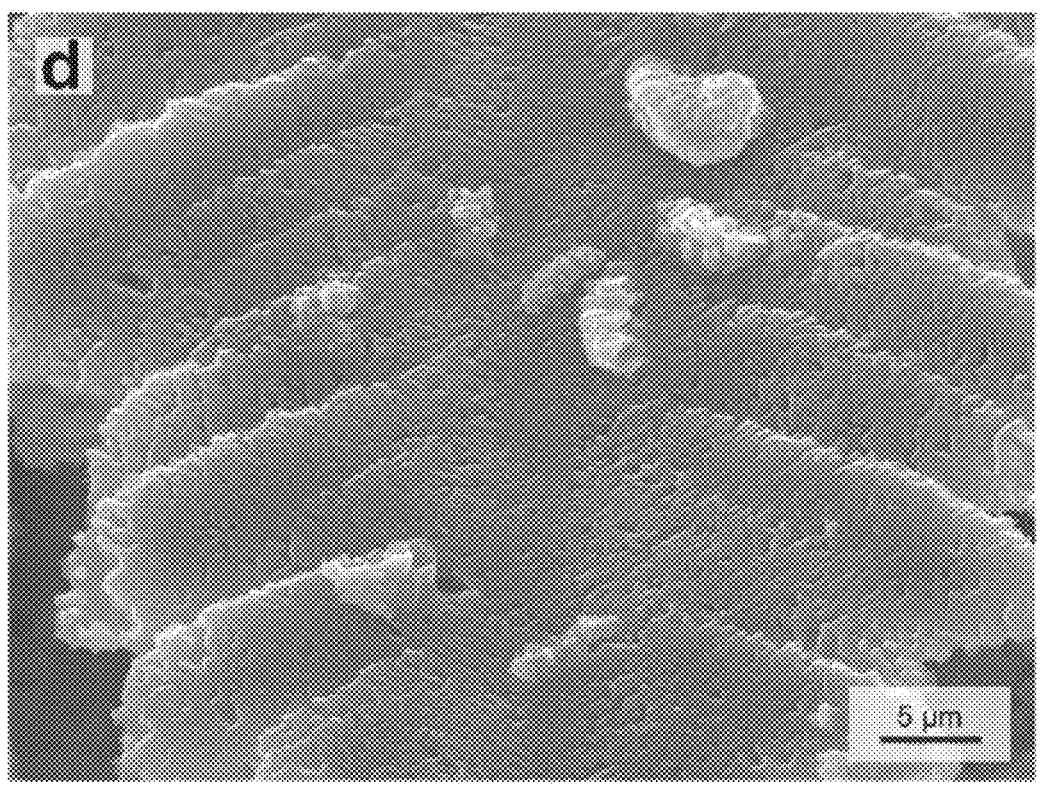
FIG. 8D is a photomicrograph of a non-flooded zinc cell taken at 0 charge-discharge cycles.
Figure 8E:
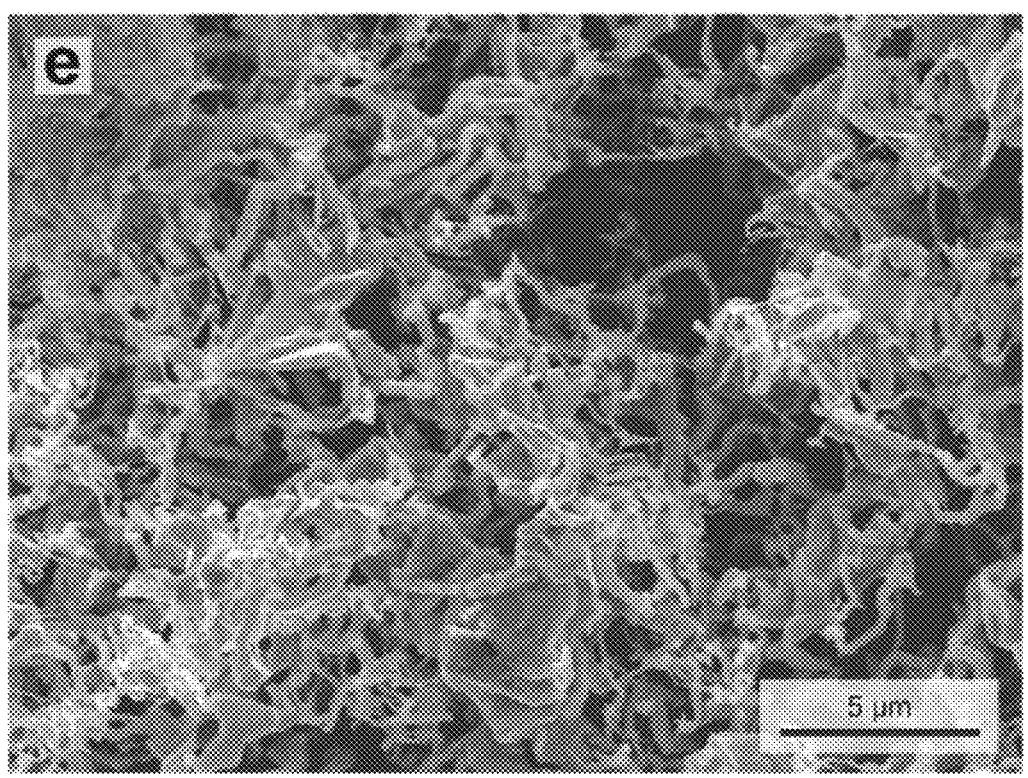
FIG. 8E is a photomicrograph of a non-flooded zinc cell taken at 40 charge-discharge cycles.
Figure 8F:
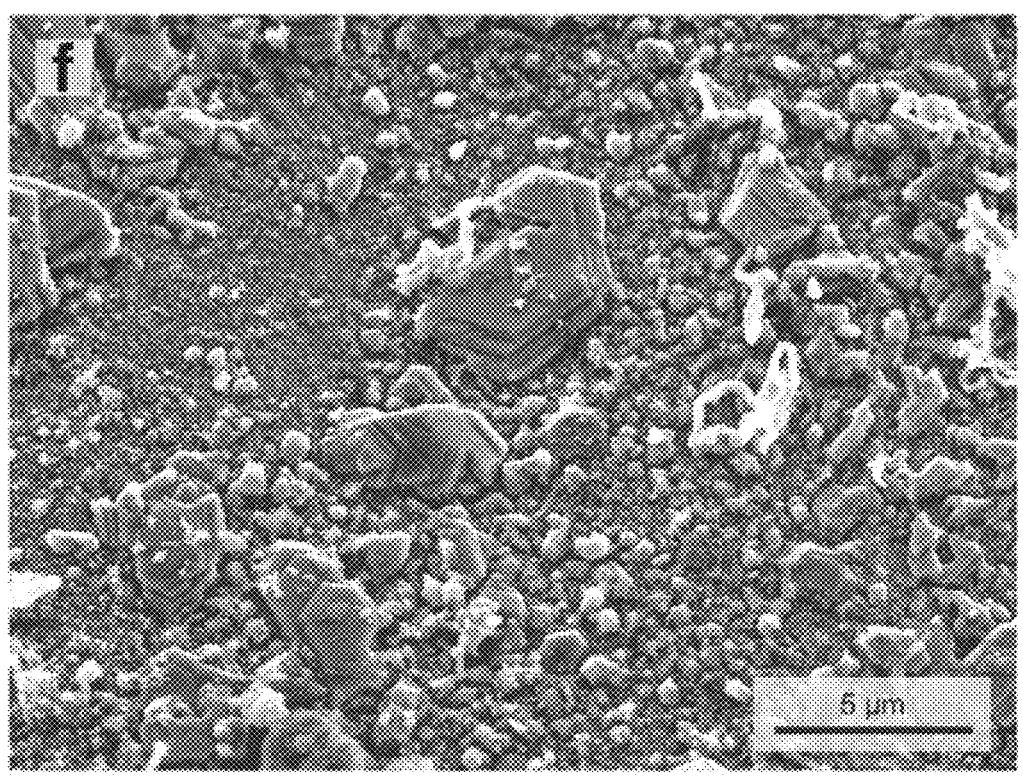
FIG. 8F is a photomicrograph of a non-flooded zinc cell taken at 100 charge-discharge cycles.

For proof-of-concept of the hyper-dendritic zinc foam reversibility in both flooded and non-flooded systems, the zinc foam was charge-discharge cycled against a conventional nickel electrode in a full cell. At the working electrode, the reversible reaction took place upon charging and discharging. The active material was initially prepared by electrodeposition of zinc on nickel mesh at −2.0 V for the zinc foam and −1.4 V for the bulk or 'equilibrium' zinc, both with a charge passed of 3000 C controlled through chronocoulometry. The operating parameters and resultant characteristics are disclosed on FIGS. 8A, 8B and 8C, and can be understood from the SEM photographs of FIGS. 8D, 8E and 8F. FIG. 8A illustrates a graph of a cell summary of flooded and non-flooded zinc electrodes cycled against conventional nickel electrodes over 100 cycles. FIG. 8B illustrates a graph of a galvanostatic charge-discharge cycling profiles of hyper-dendritic nanoporous zinc foam in a flooded cell at a rate of C/5 to a capacity limit of 40% DOD. FIG. 8C provides a graph of a galvanostatic charge-discharge cycling profiles of hyper-dendritic nanoporous zinc foam in a non-flooded cell at a rate of C/5 to a capacity limit of 40% DOD. FIGS. 8D, 8E and 8F are SEM images taken from the non-flooded zinc cell respectively at 0, 40 and 100 charge-discharge cycles.

The three-dimensional dendritic structure of nanoporous zinc on nickel mesh was confirmed under a SEM, seen in FIG. 8D. Also, the capacity of the nickel counter electrode was roughly five times higher than the working electrode to ensure no capacity limitations. The prototype cells were cycled at rate of C/5 corresponding to a current of 166.67 mA, and to 40% DOD which is equivalent to a theoretical specific capacity of 328 mAh/g, to ensure that the core dendritic structure was intact. A 15-min rest between each charge and discharge step and a voltage cutoff during discharge at −1.35 V vs Hg/HgO or 1.6 V vs Ni(OH)2/NiOOH was used. FIG. 8A shows the summarized cycling data of the specified electrodeposited zinc up to 100 cycles, and FIGS. 8B and 8C present the charge-discharging curves for the flooded and non-flooded hyper-dendritic zinc cells. The flooded cell was less constrained than the non-flooded cells, therefore the solubility of zincate never reached a saturation point. Ex-situ SEM images taken at the cycle number points of 0, 40 and 100 from the non-flooded cell are seen in FIGS. 8D, 8E and 8F, respectively. The dendritic zinc foam was cycling toward equilibrium and the electrodes after 40 cycles exhibited no dendrites at macroscale. Instead, a more densified texture was evident where primary or secondary dendrites were no longer evident but rather the well-reported 'ramified' morphology. Additionally, upon cycling no precipitation of visible ZnO was formed.

A hypothesis of a more dense structure over cycles of the hyperdendritic zinc foam was supported both by the microscopic evidence of morphology change presented, and by the shift in the open circuit potential measured at the start of the charging. Similar to the trend previously discussed with respect to FIG. 4, the open circuit potential was lower for the foam architecture, thus the charge-discharge trend over cycles indicated a densification of the foam to bulk structures. This indicates that if a cell starts with metallic zinc that was formed further from equilibrium than the average cycling protocol demands, the zinc will restructure to form a more dense morphology, filling 'inwards', before creating ramified structures, typically misstated as dendrites. The discharge voltage profile for the flooded cell showed promising stability with less than ~1% potential fade per cycle, a specific discharge capacity of 303.1±24.9 mAh g$^{-1}$, and low resistive losses across the cell over time (0.4-0.8Ω). At the 100th cycle, a specific discharge capacity of 282.3 mAh g-1 was achieved corresponding to 86.1% of the initial capacity. For the non-flooded cells, the hyper-dendritic zinc was compared with equilibrium processed zinc (−1.4 V vs Hg/HgO) presented superior capacity retention over 100 cycles.

A further study was undertaken to evaluate the performance characteristics of three different types of zinc particles: (a) Zn granules (Sigma Aldrich), (b) Zn dust (Sigma), and (c) particles of a hyper-dendritic nanoporous zinc foam produced via electrodeposition onto Ni wire or wire mesh at high overpotentials (−2.0 V vs. Hg/HgO) from a 8.9M KOH/saturated ZnO solution, as generally described supra. After deposition, the nanoporous zinc foam was washed first with deionized (DI) water, then with 0.01M $H_2SO_4$, and again with DI water. The resulting powder was vacuum dried and powdered.

Figure 9A:
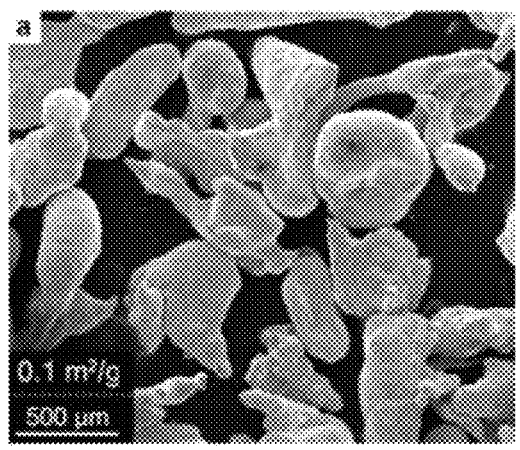
FIG. 9A is a photomicrograph of mass-specific surface areas of the Zn granules.
Figure 9B:
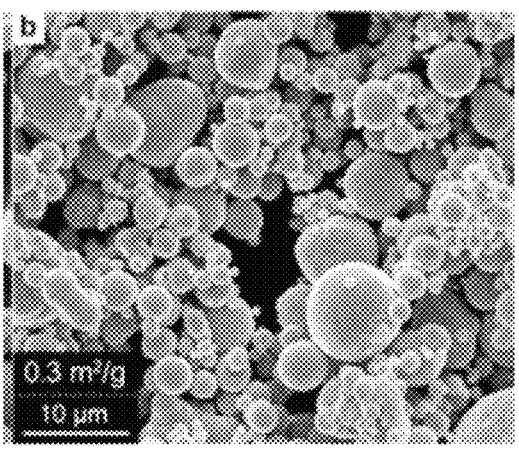
FIG. 9B is a photomicrograph of mass-specific surface area of Zn dust.
Figure 9C:
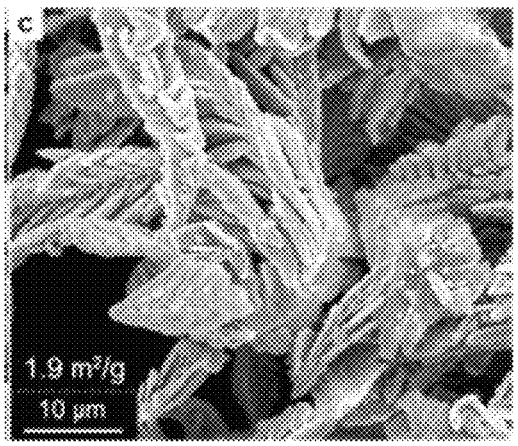
FIG. 9C is a photomicrograph of hyper-dendritic nanoporous zinc foam particles.

FIG. 9 depicts SEM images and mass-specific surface areas of the (a) Zn granules, (b) Zn dust, and (c) hyper-dendritic nanoporous zinc foam particles used in the tests. The (a) Zn granules are irregularly-shaped particles, with dimensions on the order of 100-500 μm and a surface area of ~0.1 m2/g. The (b) Zn dust particles appear to be mostly spherical in shape, with diameters on the order of 1-10 μm and a surface area of ~0.3 m2/g. The (c) particles of the hyper-dendritic nanoporous zinc foam have an overall size of 10-20 μm, with sub-micron structural features and have a surface area of ranging from ~1.9 to 3.0 m2/g. It is evident that the various zinc particles are morphologically distinct, and in particular the surface area of the (c) hyper-dendritic nanoporous zinc foam particles is significantly larger than the former two types of Zn particles (a), (b).

In a typical utilization experiment, ~20 mg of one of the types of zinc particles was spread over a ~1 cm$^2$ area on a copper foil current collector placed at the bottom of a rectangular bath cell. Nickel mesh was used as the counter electrode, with a strip of Zn plate as the reference electrode. A desired electrolyte was then slowly added until the cell was flooded (~6 mL). In this configuration, the small masses of zinc sit freely on the current collector, within the electrolyte bath; no compression was applied, nor were any conductive fillers or binding agents used, unlike conventional electrodes.

Figure 10:
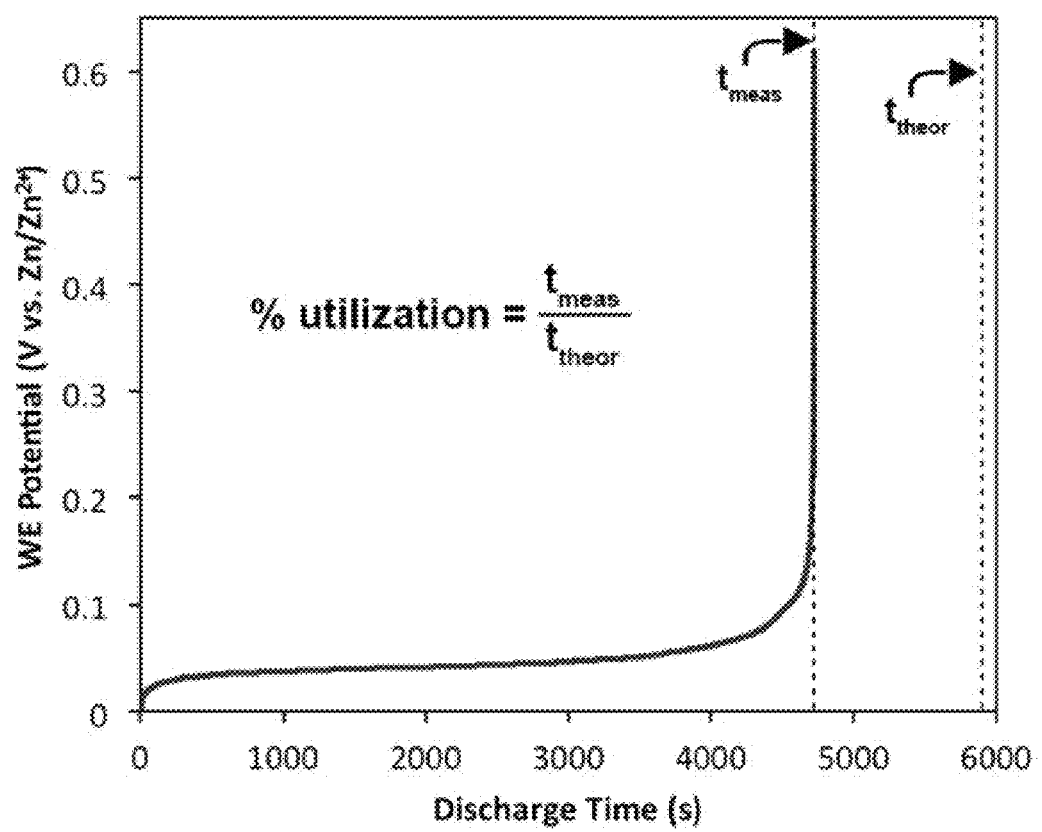
FIG. 10 depicts a graph of a representative galvanostatic discharge curve.

The utilization (i.e., the ratio of extractable capacity to theoretical capacity) of each zinc particle type was measured by galvanostatically discharging the small mass of particles using mass-specific currents of ~0.05, 0.2, 0.5, 1.0, and 2.5 A/g. Further experiments at 10 A/g and 25 A/g were run on the nanoporous zinc foam. A representative galvanostatic discharge curve is shown in FIG. 10, which depicts an example of the change in working electrode (WE) potential as a function of time during the galvanostatic discharge of Zn particles in aqueous KOH. Both, the theoretical and measured discharge times $t_{theor}$ and $t_{meas}$, respectively, are indicated by vertical dashed lines. FIG. 10 demonstrates how the potential of the working electrode (WE) changes as a function of discharge time for a typical Zn particle sample in an aqueous KOH electrolyte. Also shown are the measured discharge time ($t_{meas}$), which was considered as the time at which the WE potential exceeded a cut-off potential of +0.6V vs. Zn/Zn2+, and the theoretical discharge time ($t_{theor}$), which, for each zinc sample was calculated from the following equation:

$$t_{theoretical} = \frac{Q_{Zn} \cdot m_{Zn}}{I}$$

wherein $Q_{Zn}$ is the theoretical capacity of Zn (~820 mAh/g), $m_{Zn}$ is the mass of Zn particles being discharged, and I is the applied discharge current.

Thereafter the electrochemical utilization efficiency (% utilization) for each tested sample of zinc material was calculated from the next equation:

$$\% \text{ utilization} = \frac{t_{measured}}{t_{theoretical}} \cdot 100\%$$

which value represents the amount of useful capacity that was extracted from the Zn sample as a percentage of the theoretical capacity. As described hereinafter, a plurality of such tests were undertaken with varying electrolyte concentrations and several different additives, so to determine the system conditions and morphology for maximum utilization efficiency.

Figure 11:
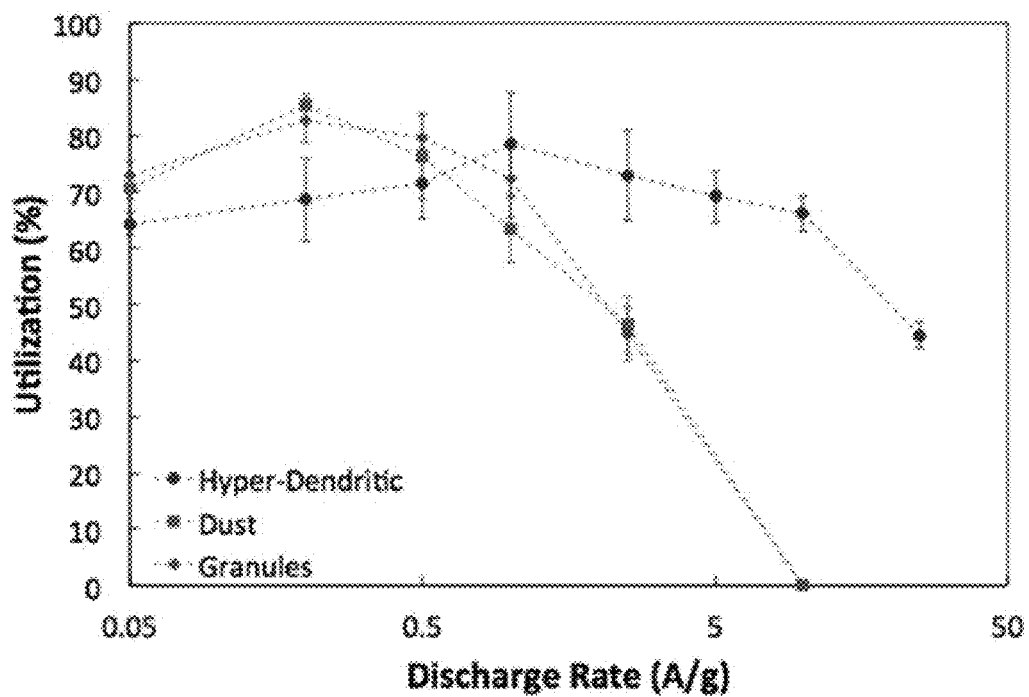
FIG. 11 depicts a graph of utilization efficiency versus the discharge rate (A/a) of three zinc types.

FIG. 11 illustrates the utilization efficiency for the three zinc types at a fixed 4M KOH electrolyte concentration. In the figure, are shown the results of the % utilization of zinc particles of the types (a) Zn granules, (b) Zn dust, and (c) hyper-dendritic nanoporous zinc foam particles which were discharged galvanostatically in 4M KOH at mass-specific currents of 0.05, 0.2, 0.5, 354 1.0, 2.5, 10 & 25 A/g., and wherein x-axis of FIG. 11 is a Log scale. All types of the zinc particles (a), (b), (c) show a clear maximum in utilization efficiency at mid-range currents, with efficiency decreasing toward both low and high current regions. Both the (a) Zn granules and (b) Zn dust had similar utilization trends, with the peak utilization at a similar current value and utilization level. All three zinc particle types showed a maximum utilization efficiency of 80-90%, however the peak efficiency of the (c) hyper-dendritic nanoporous zinc foam particles were observed at a higher current as compared with the other two morphologies of the a) Zn granules and (b) Zn dust. At 0.5 A/g and below, both the (a) Zn granules and (b) Zn dust appeared to show better utilization than the (c) hyper-dendritic nanoporous zinc foam particles. At 1.0 A/g and above however, the (c) hyper-dendritic nanoporous zinc foam particles clearly outperformed the (a) Zn granules and (b) Zn dust. At increasingly higher currents, the (c) hyper-dendritic nanoporous zinc foam particles showed further relative performance gains over the other zinc types. Despite the utilization efficiency dropping off as current increases for all of the three types of zinc particles (a), (b) and (c), the results make clear that at a rate of 2.5 A/g, the utilization of the (c) hyper-dendritic nanoporous zinc foam particles was 50% greater than that of the (a) Zn granules and (b) Zn dust, thus clearly demonstrating the superior performance characteristics of the (c) hyper-dendritic nanoporous zinc foam particles.

Figure 12:
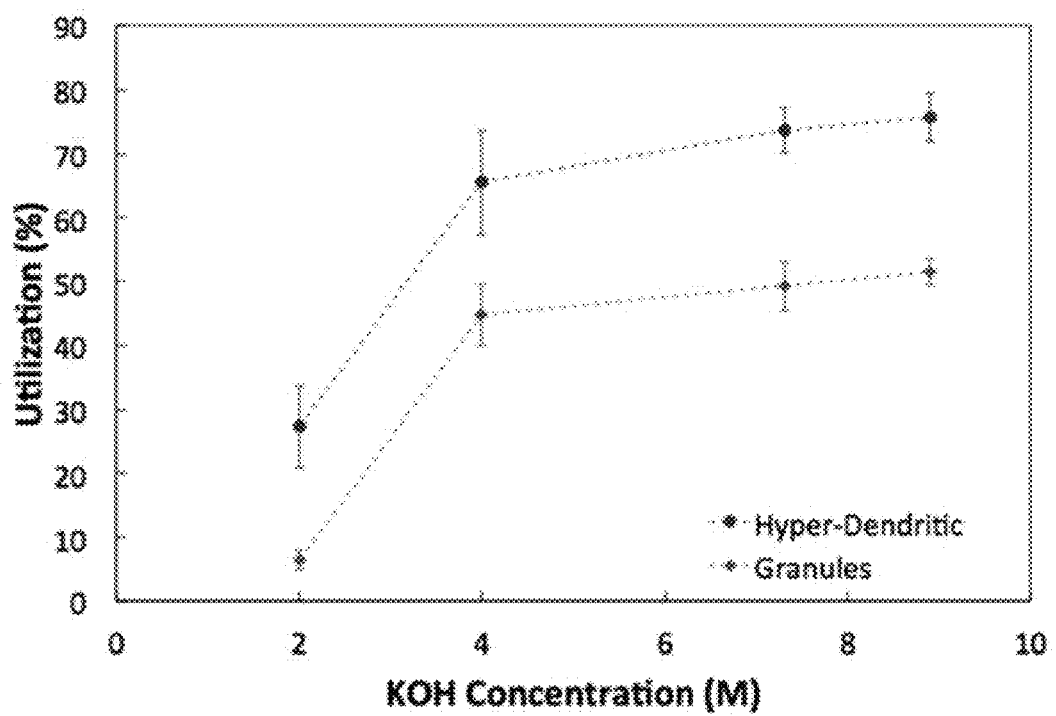
FIG. 12 depicts a graph of the impact of electrolyte concentration upon utilization (%) in systems containing (a) Zn granules and (c) hyper-dendritic nanoporous zinc foam particles.

Subsequently the impact of electrolyte concentration was evaluated in the same system, but in this test, only the (a) Zn granules and the (c) hyper-dendritic nanoporous zinc foam particles were evaluated. The (a) Zn granules and the (c) hyper-dendritic nanoporous zinc foam particles were discharged at 2.5 A/g in aqueous potassium hydroxide (KOH) electrolytes with KOH concentrations ranging from 2-8.9 M as depicted in the figure. The % utilization results are shown in FIG. 12. For both particle types (a), (c) the utilization increases with concentration, with the largest rate of increase as concentration is increased between 2 and 4M of KOH. At all concentrations, the (c) hyper-dendritic nanoporous zinc foam particles exhibited a greater utilization efficiency than the (a) Zn granules.

The invention claimed is:

1. An electrode comprising hyper-dendritic nanoporous zinc foam.

2. An electrode according to claim 1, electrodeposited hyper-dendritic nanoporous zinc foam upon a substrate or structure.

3. An electrode according to claim 1, wherein the hyper-dendritic nanoporous zinc foam comprises nanoparticles formed on secondary dendrites in a three-dimensional network.

4. An electrode according to claim 3, wherein the nanoparticles formed on secondary dendrites in a three-dimensional network with a particle size distribution of 54.1-96.0 nm.

5. A method of forming an electrode according to claim 1, which method comprises the step of:
    depositing zinc from an aqueous composition which includes zinc via electrodeposition onto a substrate or structure using an electrical overpotential to thereby form hyper-dendritic nanoporous zinc foam having primary and secondary dendrites in a three-dimensional network.

6. A method according to claim 5, wherein the zinc foam provides an electrical current pathway therethrough and to the substrate or structure.

7. A method according to claim 5, wherein the substrate or structure contains nickel.

8. A method according to claim 5, wherein said zinc foam is formed in potentiostatic charging conditions at −2.0 volt versus mercury/mercury oxide and higher, in a three-electrode setup consisting of a platinum or nickel working electrode, a mercury/mercury oxide reference electrode and a platinum or nickel counter electrode.

9. A primary or secondary battery which comprises an electrode according to claim 1.

* * * * *